United States Patent [19]

Lalancette

[11] 4,411,092
[45] Oct. 25, 1983

[54] FISH TRAP HAVING A CARDIOIDAL STRUCTURE

[76] Inventor: Louis-Marie Lalancette, 532 Judith Jasmin, Chicoutimi, Quebec, Canada, G7H 6M8

[21] Appl. No.: 272,017

[22] Filed: Jun. 9, 1981

[30] Foreign Application Priority Data

Apr. 1, 1981 [CA] Canada .................................. 374390

[51] Int. Cl.³ ................................................ A01K 69/08
[52] U.S. Cl. ................................................ 43/100
[58] Field of Search ................. 43/100, 102, 103, 105

[56] References Cited

U.S. PATENT DOCUMENTS

| 427,049 | 5/1980 | Cochennour . | |
|---|---|---|---|
| 885,671 | 4/1908 | Eason . | |
| 1,670,039 | 5/1928 | Lewis | 43/100 |
| 2,726,478 | 4/1953 | Pullen | 43/100 |
| 2,731,761 | 1/1956 | Marshall | 43/100 |
| 2,979,855 | 4/1961 | Bowsher | 43/100 |
| 3,099,890 | 8/1963 | Madere | 43/100 |
| 3,176,427 | 4/1965 | Hershey | 43/100 |
| 3,699,702 | 10/1972 | Lankenau | 43/100 |
| 3,906,654 | 9/1975 | Leslie | 43/65 |

FOREIGN PATENT DOCUMENTS

| 2609215 | 9/1976 | Fed. Rep. of Germany | 43/100 |
|---|---|---|---|
| 32122 | 4/1921 | Norway | 43/100 |
| 120580 | 1/1948 | Sweden | 43/100 |

*Primary Examiner*—Nicholas P. Godici
*Assistant Examiner*—M. Jordan
*Attorney, Agent, or Firm*—Keil & Witherspoon

[57] ABSTRACT

An improved trap for catching small fishes such as minnows or suckers, comprising a wire mesh basket provided with a central opening for allowing the fishes to enter the trap. This improved trap advantageously has a cardioidal structure which substantially reduces the possibilities for the fishes to escape and thus substantially increases its total efficiency of capture.

6 Claims, 7 Drawing Figures

4,411,092

FISH TRAP HAVING A CARDIOIDAL STRUCTURE

BACKGROUND OF THE INVENTION (a) Field of the Invention

The present invention is concerned with a fish catching trap and more especially with a trap having an improved structure that substantially reduces the possibilities for the fishes already captured to escape and thus substantially increases the total efficiency of capture.

(b) Description of the Prior Art

As everybody knows, fish catching traps consisting of a wire mesh basket provided with a central opening to allow the fishes to enter the trap, have been known and used for at least decades and maybe centuries. It is also known that if some of the known fish catching traps are structurally different from each other, however they all have in common a substantially rectangular structure (see as example the U.S. Pat. No. 2,726,478, dated Dec. 13, 1955, in the name of R. R. Pullen) which structure is not adequate to hold fishes in captivity for a long period of time. Indeed, the fishes already captured with such a rectangular fish catching trap are generally able to escape from the basket after a certain period of time, thus contributing to reduce the total efficiency of capture of said trap.

Furthermore, already known fish catching traps in most of the cases comprise at least one cage for the baits located in the center of the basket. This particular location of the cage for baits has a very particular disadvantage, namely the fact that the fishes detecting the baits from the outside of the trap can go to and pass through the central opening giving access to the inside of the trap only if they are near from said opening. This disadvantage also contributes to substantially reduce the total efficiency of capture of the known traps.

SUMMARY OF THE INVENTION

The main object of the present invention is to provide an improved trap which overcomes the above mentioned disadvantages. In accordance with the present invention, this object is achieved with a trap for catching small fishes, which trap comprises a wire mesh basket provided with a central opening for allowing the fishes to enter the basket. Advantageously the basket has a cardioidal structure in order to reduce the possibilities for the fishes to escape from the trap.

DRAWINGS

The present invention will be better understood with reference to the following non-restrictive description of a preferred embodiment thereof, taken in connection with the accompanying drawings in which.

DESCRIPTION OF A PREFERRED EMBODIMENT

Figure 1:
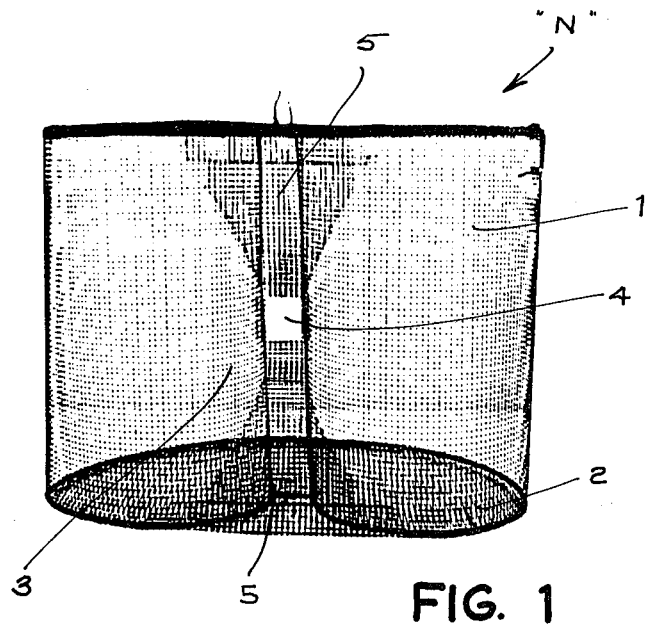
FIG. 1 is a front elevational view of a fish catching trap according to the present invention.
Figure 2:
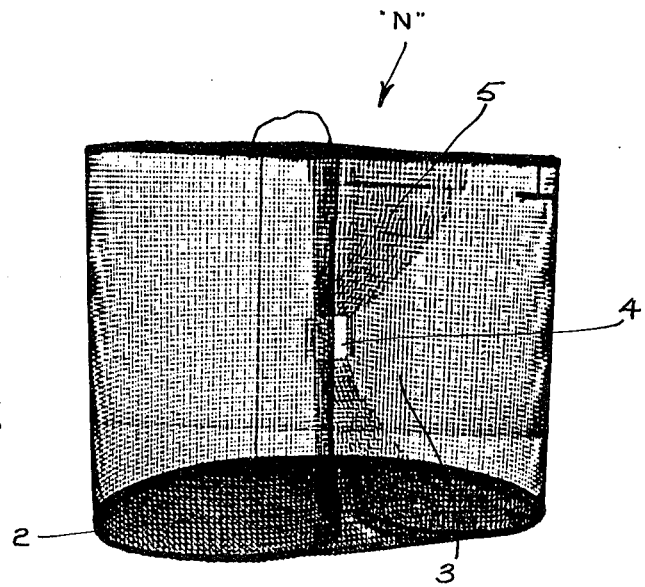
FIG. 2 is a lateral view of trap shown in FIG. 1.

The trap N as shown on FIGS. 1 to 4, comprises a wire mesh basket having a cylindrical body (1) whose ends (2) are each in the shape of a cardioid. This body (1) comprises a retrogressing zone (3) extending along the entire height of the basket, which zone is flattened and comprises, in its middle portion an opening (4) for allowing the fishes to enter the basket. The trap N also comprises two flat wire mesh walls (5) slantwisely mounted in the retrogressing zone (3), from the central opening (4) to the periphery of both ends (2) of the cylindrical body (1), respectively. These walls (5) together with the cylindrical body (1) define a funnel-shaped opening extending in front of the central opening (4) of the trap.

Figure 3:
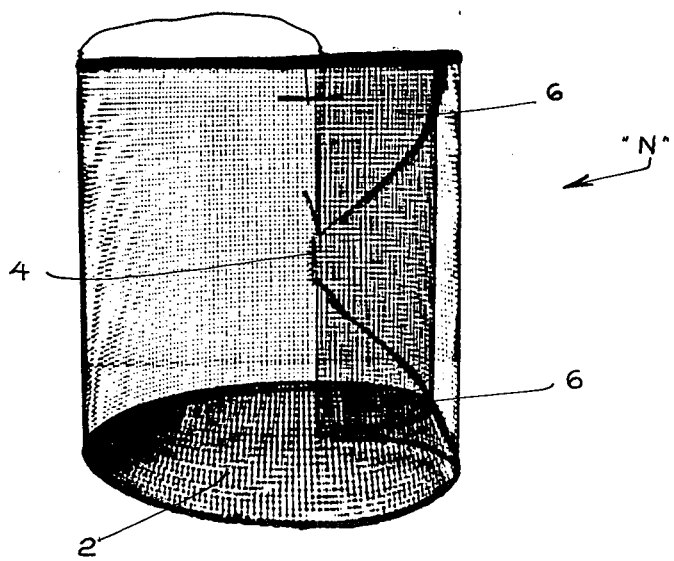
FIG. 3 is a side elevational view of the trap shown in FIG. 1.
Figure 4:
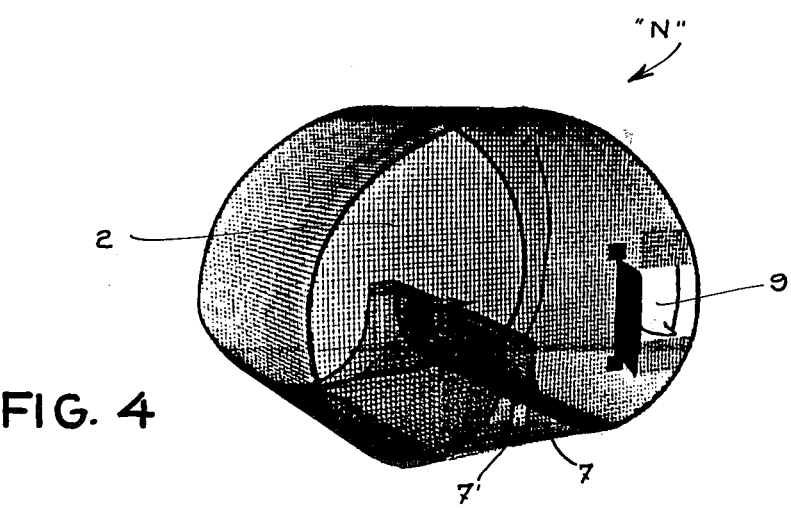
FIG. 4 is a top perspective view of the trap shown in FIG. 1.
Figure 7:
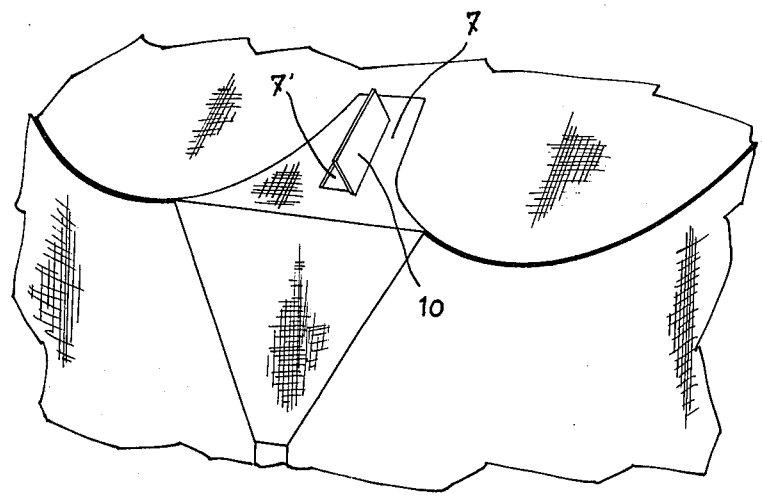
FIG. 7 is an enlarged perspective view of the opening and the door of the cage for baits of the trap shown in FIGS. 1 to 4.

As shown on FIGS. 3, 4 or 7, the trap N further comprises two cages (6) for baits, which are respectively located on both sides of the central opening (4). These cages (6) are defined by the bottom of the retrogressing zone (3), the flattened walls (5) extending within this zone from the central opening (4) to the periphery of both ends (2) of the cylindrical body (1) and two other wire mesh walls (7). These other wire mesh walls (7) extend in the planes of the cardioid-shaped ends (2) of the cylindrical body (1) and give to each of them the general shape of an ellipsoid.

Each wire mesh wall (7) is provided with an opening (7') of small size, having a width approximately equal to the third of its length. This opening (7') is provided with a door (10) as shown on FIG. 7. The door (10) is used for closing the opening (7') to avoid that live baits such as live small fishes, introduced into each cage escape therefrom.

A door (9) is provided onto at least one of the ends (2) of the cylindrical body (1) to allow removal of the fishes caught by the trap.

The wire mesh constituting the body and walls of the trap N may be of any type. Advantageously, the wire mesh basket may comprise a rigid frame, preferably of metal. This frame may be of iron or aluminum.

As described in the preamble of the present application, the cardioidal structure of the trap N is an essential characteristic of the invention. Indeed this particular structure forces any fish having entered the trap and following the inner wall of the cylindrical body (1) to find an escape opening, to return to the bottom of the trap when it approaches the central opening (4) located in the retrogressing zone (3), and thus to avoid this central opening.

Figure 5:
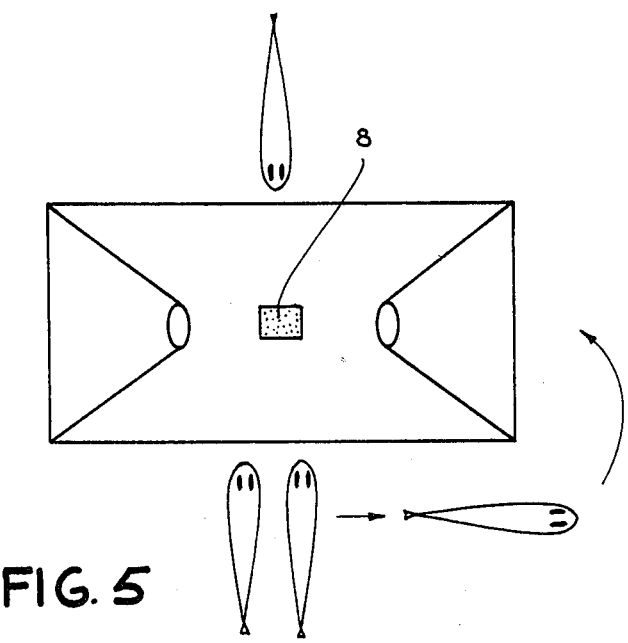
FIG. 5 is a schematic top plan view of a prior art trap showing the approach of the fishes.

Furthermore, a fish detecting a bait located in the center of a rectangular trap (see FIG. 5) will always approach the bait in a straight line. Depending on its position, the fish then may reach a wall with no opening. In order to enter inside of trap, the fish has to move around the angles of the walls, and during this time, it may be attracted by many other things.

Figure 6:
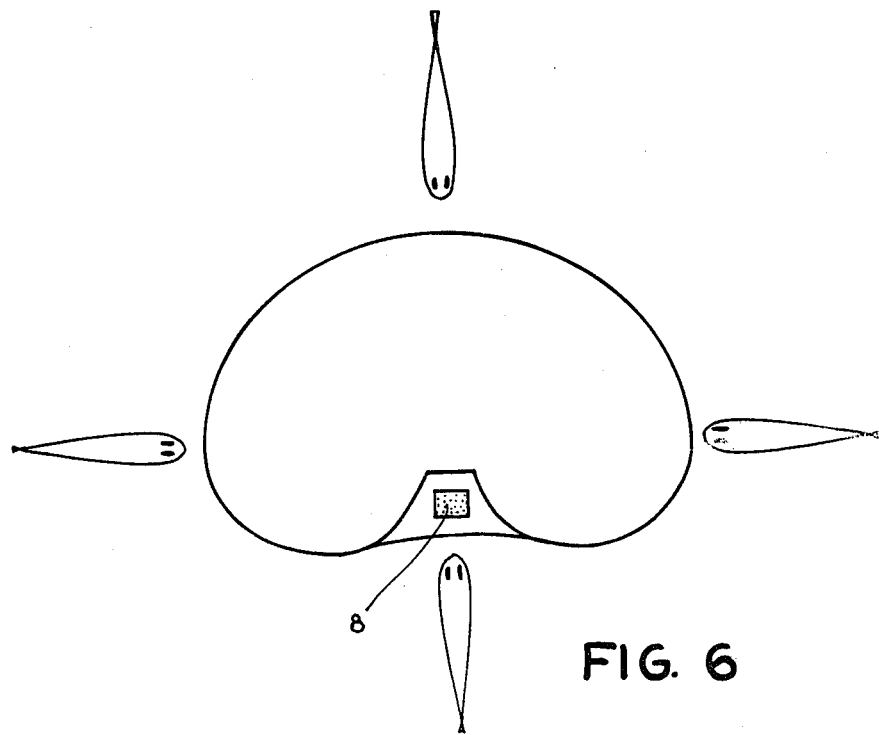
FIG. 6 is a schematic top plan view of the trap of FIG. 1, showing the approach of the fishes.

With a trap N according to the invention (see FIG. 6), as soon as a fish detects a bait in the cages for baits located on both sides of the central opening, it approaches in a straight line. Depending on its position, the fish may approach a wall with no opening but, in this case, it will follow the rounded, outer walls of the trap and continuously approach the bait because the particular structure of the trap. Thereafter the fish will be directed into the funnel opening formed by both cages for baits and the retrogressing zone and thus enter the trap.

The trap N according to the invention is provided for the capture of fishes such as minnows or suckers, which fishes are attracted by baits and/or their smell.

Of course, the size of trap N according to the invention depends on its use and may vary according to the fisher's requirements. However, a standard size of 90 cm×60 cm×60 cm with a wire mesh having meshes of 6 mm is preferred in order to provide the trap with a good stability in the aquatic medium, a sufficient volume for the retention of captured fishes and a good maneouverability. It has been observed during the comparative experiments described hereinafter, that a trap N according to the invention having the above mentioned size has an efficiency of capture approximately 10 times higher than a trap having the same volume but a rectangular structure, in the same aquatic medium and during the same period of time.

During the same comparative experiments, it has also been observed that a trap N according to the invention comprising two openings also has an efficiency higher than a prior art trap of the same volume, having two openings. However, the results thus obtained have shown that the efficiency of a trap according to the invention with two openings is substantially lower than the efficiency of a trap according to the invention provided with one opening.

In order to demonstrate the superiority of the trap according to the invention vs. a rectangular trap, the plurality of non-restrictive comparative experiments referred to hereinabove will now be described in details. It should be noted that these experiments were both carried out in laboratory and in a natural aquatic medium.

In laboratory, the comparative experiments were carried out with a rectangular trap of 10 cm×10 cm×23 cm and an ellipsoidal trap of the same volume. Both traps were immersed in the center of an aquarium of 150 cm×45 cm×45 cm.

EXAMPLE I

In order to determine the capture efficiency, a bait constituted of bread was placed in the center of the rectangular trap and in the cages for baits of the trap according to the invention. Thereafter, 75 minnows (*notropis atherinoides*) having a length ranging from 5 to 12 cm, and which were not fed for a while in order to increase their appetite, were freed into the aquarium. Furthermore, the position of traps was modified periodically and four different experiments were successively carried out. The numbers of fishes (minnows) captured with the rectangular trap and the trap according to the invention are shown in the table I.

TABLE I

| No. of experiment | Rectangular trap | Trap according to the invention | $X^2$ |
|---|---|---|---|
| 1 | 466 | 393 | 6.2* |
| 2 | 253 | 258 | 0.04 |
| 3 | 110 | 119 | 0.36 |
| 4 | 177 | 129 | 7.5* |
| TOTAL | 1006 | 899 | 6.0* |

*This value is significative at level of 0.05.

It should be noted that the above experiments relating to the capture of minnows in laboratory did not produce significant results because the exiguity of the aquatic medium, used for these experiments, and the fact that the minnows are instinctively attracted by the light sources which are numerous in a laboratory. These factors have probably altered the obtained results. For this reason, further experiments have been carried out in a natural aquatic medium (see Example 3).

EXAMPLE 2

In order to verify the efficiency of the trap according to the invention to retain fishes, 25 minnows were introduced in laboratory, in a trap according to the invention and in a rectangular trap, both identical to the ones used in the Example I. The numbers of fishes escaped from the traps were determined as a function of the time and the obtained results are shown in Table II.

TABLE II

| Time (hours) | Rectangular trap | Trap according to the invention |
|---|---|---|
| ¼ | 6 | 1 |
| ½ | 4 | 1 |
| ¾ | 1 | 1 |
| 1 | 0 | 0 |
| 2 | 2 | 2 |
| 4 | 2 | 1 |
| 8 | 3 | 0 |
| 16 | 3 | 1 |
| 24 | 3 | 0 |
| 25 | 1 | 0 |
| TOTAL | 25 | 7 |

EXAMPLE 3

Comparative experiments relating to the efficiency of catching fishes were carried out in a natural aquatic medium with a cardioidal trap according to the invention, having a 60 cm×60 cm×90 cm size and a wire mesh with wire meshes of 6 mm, and a rectangular trap having the same volume and meshing than the cardioidal trap according to the invention. Both traps were immersed at a depth of 2 meters and at a distance of 1 meter from each other.

For the capture, a bait of bread was placed in the center of the rectangular trap and in each cage for baits of the trap according to the invention. The fishes that were captured during these experiments were suckers (*catostomus commersoni*) and/or minnows. During these experiments, the position and orientation of the openings of traps were periodically changed.

The numbers of fishes captured in this natural aquatic medium by both traps are given in Table III and IV.

TABLE III

| No. of experiment | Rectangular trap Number of fishes caught | Trap according to the invention Number of fishes caught |
|---|---|---|
| 1 | 8 | 51 |
| 2 | 4 | 28 |
| 3 | 8 | 156 |
| 4 | 22 | 146 |
| 5 | 4 | 62 |
| 6 | 10 | 27 |
| 7 | 7 | 108 |
| 8 | 6 | 52 |
| 9 | 4 | 76 |
| 10 | 29 | 218 |
| 11 | 14 | 172 |
| 12 | 12 | 98 |
| 13 | 3 | 42 |
| 14 | 5 | 30 |

TABLE III-continued

| No. of experiment | Rectangular trap Number of fishes caught | Trap according to the invention Number of fishes caught |
|---|---|---|
| TOTAL | 144 | 1246 |

TABLEAU IV

| | Rectangular trap | | Trap N according to the invention | |
|---|---|---|---|---|
| No. of experiment | Suckers (number) | Minnows (number) | Suckers (number) | Minnows (number) |
| 1 | 3 | 2 | 8 | 8 |
| 2 | 4 | 9 | 1 | 13 |
| 3 | 7 | 6 | 80 | 23 |
| 4 | 16 | 3 | 284 | 14 |
| 5 | 34 | 2 | 324 | 19 |
| 6 | 18 | 0 | 76 | 12 |
| 7 | 8 | 9 | 77 | 20 |
| 8 | 12 | 2 | 88 | 16 |
| 9 | 8 | 4 | 148 | 29 |
| 10 | 9 | 4 | 92 | 40 |
| 11 | 12 | 6 | 137 | 42 |
| 12 | 3 | 1 | 15 | 24 |
| 13 | 4 | 10 | 58 | 32 |
| 14 | 5 | 3 | 32 | 37 |
| TOTAL | 143 | 61 | 1420 | 329 |

EXAMPLE 4

Comparative experiments were carried out in the same natural conditions as in Example 3, to compare the efficiency of retention of a trap according to the invention with respect to that of a rectangular trap. In this experiment, 25 suckers were introduced in each trap and the number of fishes escaped was determined as a function of the time. The obtained results are shown in Table V.

TABLE V

| Time (days) | Rectangular trap (number of fishes already escaped) | Trap N according to the invention (number of fishes already escaped) |
|---|---|---|
| 1 | 20 | 4 |
| 2 | 4 | 5 |
| 4 | 1 | 4 |
| TOTAL | 25 | 13 |

I claim:

1. In a trap for catching small fishes of the type comprising a wire mesh basket provided with a central opening for allowing the fishes to enter the trap, the improvement wherein the basket has a cardioidal structure in order to reduce the possibilities for the fishes to escape from the trap, wherein the wire mesh basket comprises a cylindrical body with ends in the shape of a cardioid and a retrogressing zone extending along the whole height of the body, said retrogressing zone being flattened and comprising the opening of said basket in its middle portion and wherein the basket further comprises two flat wire mesh walls slantwisely mounted in the retrogressing zone from the central opening to the periphery of both ends of the cylindrical body respectively, said walls defining together with the body a funnel shaped opening extending in front of the central opening of the trap.

2. A trap according to claim 1, further comprising two cages for baits, located on both sides of the central opening respectively, said cages being defined by the retrogressing zone, the flattened walls extending within said zone from the central opening to the periphery of both ends of the cylindrical body and two other wire mesh walls, said other wire mesh walls extending in the planes of both cardioid-shaped ends of the body and giving each of them the general shape of an ellipsoid.

3. A trap according to claim 2, wherein the other wire mesh walls of the bait cages both comprise an opening provided with a closable door for inserting the bait.

4. A trap according to claim 1, wherein at least one door is provided into at least one of the ends of the body for removing the fishes caught by the trap.

5. A trap according to claim 1 wherein the wire mesh basket is mounted onto a rigid frame.

6. A trap according to claim 5, wherein the frame is of the metal type.

* * * * *